July 16, 1946. M. P. BLOMBERG 2,403,904
HEADLIGHT MOUNTING
Filed Nov. 19, 1943
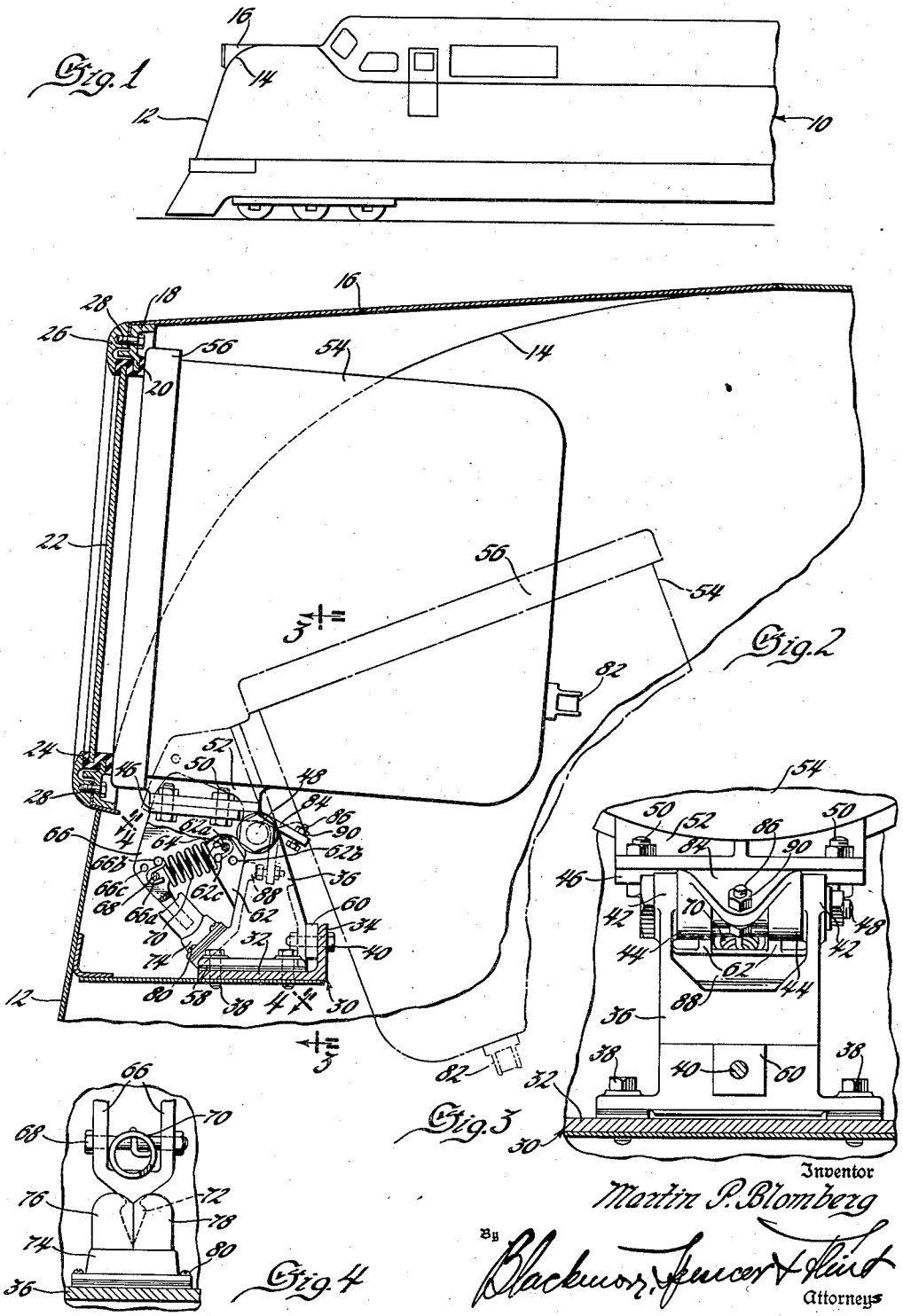

Patented July 16, 1946

2,403,904

UNITED STATES PATENT OFFICE 2,403,904

HEADLIGHT MOUNTING

Martin P. Blomberg, Hinsdale, Ill., assignor to General Motors Corporation, Detroit, Mich., a corporation of Delaware Application November 19, 1943, Serial No. 510,982

6 Claims. (Cl. 248—292)

This invention relates to headlights of the type used on locomotives, and more particularly to the mounting of such headlights. In locomotives, especially those of the Diesel-electric type, it is considered advantageous to be able to obtain access to the headlight structure, and particularly to the interior of the headlight housing, from the inside of the locomotive body. This permits changing bulbs, cleaning reflectors, making adjustments and any other necessary attention under any weather conditions and even while the locomotive is running.

Among the objects of this invention are the provision of a mounting for a locomotive headlight wherein the headlight housing will be positively held in normal or operating position, but may be released therefrom to permit swinging it downwardly simply by exerting a pulling action on it; wherein during its downward swinging movement it will cause the tension on a spring to be increased so as to balance the weight of the housing thereby making it unnecessary for the operator to support its weight during the lowering movement and making it much easier to swing it back up to its operating position; and wherein an adjustable stop means serves to limit the downward swinging movement of the housing to prevent the latter from striking adjacent portions of the locomotive body or the equipment located therein and becoming damaged thereby.

Other objects and advantages of the invention will be apparent upon reference to the following description and accompanying drawing, in which:

Fig. 1 is a side elevational view of the front portion of a locomotive body embodying my improved headlight mounting;

Fig. 2 is an enlarged longitudinal and vertical sectional view through the headlight mounting, showing the details of construction thereof;

Fig. 3 is a sectional view taken on the line 3—3 of Fig. 2; and

Fig. 4 is a sectional view taken on the line 4—4 of Fig. 2.

The reference numeral 10 indicates generally a locomotive body, the front end wall 12 of which is rounded as at 14 to produce a streamlined effect. Projecting forwardly from this rounded part, on the longitudinal center line of the locomotive, is a tubular portion 16, in the front end of which is secured, by welding or in any other suitable manner, an annular member 18 which has an inwardly extending flange 20 formed on it. A transparent closure or lens 22 is received in a sleeve 24 formed of resilient material which fits over the flange 20. The sleeve is held in place by a ring 26 which is drawn toward the member 18 by screws 28 which pass through holes formed in the member.

Extending across the front end of the body and secured to the framework thereof in any suitable manner is an L-shaped member 30 having a horizontally extending leg 32 and a vertically extending leg 34. Mounted on top of this member is a support bracket 36 which is secured thereto by screws 38 which are threaded into the leg 32, and a bolt 40 which extends through the leg 34. Located at the upper part of this bracket are spaced lugs 42 between which fit portions 44 of a hinge bracket 46, the latter being pivotally connected to the support bracket by a bolt 48 which extends through openings formed in the lugs 42 and the portions 44.

The hinge bracket 46 is connected by bolts 50 to a base portion 52 which is secured to the headlight housing 54. A ring 56 secured to the front edge of the housing is adapted to seat against the resilient sleeve 24, the position of the housing being adjusted to bring about the proper relationship of the parts to permit this by the insertion of shims 58 between the bracket 36 and the leg 32, and a shim 60 between that bracket and the leg 34.

Extending forwardly from the bracket 36 are two spaced arms 62, each having holes 62a, 62b and 62c formed in them. Either set of these holes is adapted to receive a bolt 64, the latter being shown in Fig. 2 as being inserted in the holes 62a. Extending downwardly from the hinge bracket 46 are two spaced arms 66 each of which has holes 66a, 66b and 66c formed in them, and a bolt 68 is shown in Fig. 2 as being inserted in the holes 66a. A tension spring 70 has its ends hooked over the bolts 64 and 68.

As best shown in Fig. 4, the ends of the arms 66 are jointed together to form a spearhead 72 which is adapted to be received in a catch 74 having two portions 76 and 78 which are urged toward each other by a spring which is not shown since the catch is of a well-known standard construction which is quite commonly used for holding doors and like parts in various positions. The catch 74 is secured to the support bracket 36 by screws 80.

When the headlight is moved to its normal operating position, as shown in full lines in Fig. 2, the spearhead 72 enters between the portions 76 and 78 of the catch, which grasp it and hold it in such position that the ring 56 on the front of the housing will be firmly held against the resilient sleeve 24. When it is desired to obtain access to the interior of the headlight housing from the inside of the locomotive body to replace the bulb, clean the reflector or for any other reason, the housing is pulled rearwardly and downwardly by grasping the handle 82 secured to the back of the housing. This pulling movement causes the spearhead to be released from the spring-held catch 74, allowing the housing to swing about the pivot point formed by the bolt 48 to the position shown by the dot-and-dash lines in Fig. 2.

This downward swinging movement of the headlight housing is resisted or balanced by the spring 70, the tension of which increases as the housing swings downwardly, due to the fact that it is secured at one end to the bolt 64 which is fixed and at the other end to the bolt 68 which moves farther away from the bolt 64 as the housing is swung downwardly. The location of the holes in the arms 62 and 66 is such that if desired more tension may be obtained from the spring by placing the bolts 64 and 68 in the holes 62b and 66b respectively, and still greater tension may be obtained by placing the bolts 64 and 68 in the holes 62c and 66c respectively.

In order to limit the downwardly swinging movement of the housing, the hinge bracket 46 has an arm 84 formed on it, and a stop screw 86 threaded into this arm is adapted to engage a portion 88 on the support bracket 36 when the housing has swung downwardly as far as is necessary to permit access to the interior of it. The position of the stop screw 86 may be adjusted by threading it into or out of the arm so that it will engage the portion 88 before the housing can strike any of the adjacent parts of the locomotive body or the equipment located therein and become damaged thereby. After being adjusted to the correct position, the stop screw may be locked in that position by a lock nut 90.

While a specific embodiment of my invention has been shown and described, it will be understood that various changes in details of design or arrangement of parts may be made without departing from the spirit and scope of the appended claims.

I claim:

1. In a headlight mounting, the combination of a support bracket, a hinge bracket pivotally connected thereto, a headlight housing secured to said hinge bracket, and means associated with said brackets serving to balance the weight of said housing as the latter is swung downwardly with respect to the support bracket.

2. In a headlight mounting, the combination of a support bracket, a hinge bracket pivotally connected thereto, a headlight housing secured to said hinge bracket and spring means associated with said brackets adapted to be placed under increasing tension to balance the weight of said housing as the latter is swung downwardly with respect to the support bracket.

3. In a headlight mounting, the combination of a support bracket, a hinge bracket pivotally connected thereto, a headlight housing secured to said hinge bracket, spring means associated with said brackets adapted to be placed under increasing tension to balance the weight of said housing as the latter is swung downwardly with respect to the support bracket, and means adapted to permit variation of the amount of tension placed upon said spring means to compensate for variations in the weight of said housing.

4. In a headlight mounting, the combination of a support bracket, a headlight housing, a hinge bracket secured to the housing, said hinge bracket being pivotally connected to the support bracket whereby the housing may be swung downwardly with respect to the support bracket, and a spring-actuated catch secured to said support bracket, said catch being adapted to engage a projection extending from the hinge bracket to serve to hold said housing in its uppermost position.

5. In a headlight mounting, the combination of a support bracket, a hinge bracket pivotally connected thereto, a headlight housing secured to said hinge bracket, said support bracket having a plurality of spaced holes formed therein, a bolt adapted to fit into any one of said holes, said hinge bracket having a plurality of spaced holes formed in it, a bolt adapted to fit into any of said holes, a spring having its ends connected to said bolts and adapted to be placed under increasing tension as the housing is swung downwardly with respect to the support bracket, the amount of tension placed upon the spring being variable by inserting said bolts in the different holes in said brackets.

6. In a mounting for a headlight in a locomotive body having an opening provided in the front end thereof, a resilient ring located in said opening, a member supported by the body framework adjacent to the opening, a support bracket mounted on said member, a hinge bracket pivotally connected to said support bracket, a headlight housing secured to the hinge bracket, said housing normally being held against said ring, and means adapted to adjust the position of said support bracket relative to said member whereby the location of said housing may be varied relative to said resilient ring.

MARTIN P. BLOMBERG.